Patented Feb. 19, 1952

2,586,357

UNITED STATES PATENT OFFICE 2,586,357

TETRAFLUOROETHYLENE POLYMER COMPOSITIONS

Walter E. Llewellyn, Nutley, N. J., assignor to E. I. du Pont de Nemours and Company, Wilmington, Del., a corporation of Delaware No Drawing. Application June 30, 1950, Serial No. 171,531

5 Claims. (Cl. 260—33.6)

This invention relates to new compositions comprising coagulated tetrafluoroethylene polymer and hydrocarbon lubricants.

It has been known previously that finely divided polytetrafluoroethylene can be dispersed in various organic media, as well as in an aqueous suspension. It has also been known that polytetrafluoroethylene can be fabricated into shaped articles by subjecting the finely divided polymer to pressure, and thereafter heating the resulting article at a temperature above 327° C. until sintered, and cooling the sintered shaped article. Although highly valuable and useable, these previously known forms of polytetrafluoroethylene and compositions prepared therefrom have not been entirely satisfactory for extrusion and coating applications. Moreover, these previously known methods for shaping polytetrafluoroethylene required long processing cycles and in many instances resulted in the development of flaws and fractures in the shaped products.

It is therefore an object of this invention to provide new compositions based on tetrafluoroethylene polymer which are readily adapted to be extruded, coated, calendered and molded. Another object is to provide new and useful, lubricated polytetrafluoroethylene compositions. Other objects will be apparent from the description of the invention given below.

The above objects are accomplished according to this invention by the provision of non-aqueous pressure-coalescing compositions comprising colloidal particles of tetrafluoroethylene polymer, which in particular embodiments have been coagulated from an aqueous colloidal suspension of the polymer, intimately admixed with a hydrocarbon having a viscosity of at least 0.45 centipoise at 25° C. and a melting point of less than 100° C., said hydrocarbon being present in an amount equal to from 5% to 50% of the combined weight of said polymer and hydrocarbon. Preferably the composition comprises colloidal particles of polytetrafluoroethylene admixed with 15% to 30% of an unctuous petroleum lubricant, such as petrolatum, which is actually a mixture of hydrocarbons of various molecular weights.

Whereas the invention will be described chiefly with respect to polytetrafluoroethylene (i. e., tetrafluoroethylene homopolymer), it is to be understood that the invention also applies to other tetrafluoroethylene polymers. Thus, tetrafluoroethylene copolymers comprising the polymerization product of a mixture of tetrafluoroethylene and another unsaturated organic compound (e. g., ethylene and chlorotrifluoroethylene) containing a terminal ethylenic double bond, said organic compound being copolymerizable with tetrafluoroethylene and being present in said mixture in an amount of up to 15% of the combined weight of tetrafluoroethylene and said organic compound, may be employed in place of polytetrafluoroethylene, provided the presence of the other compounds does not destroy the essential and characteristic qualities of the colloidal particles. Also there may be employed tetrafluoroethylene polymers in which the end groups of the polymer chain are supplied by non-polymerizable compounds (e. g., methanol and ethanol) which are present during the polymerization reaction. The tetrafluoroethylene polymers employed in the practice of the present invention embrace the above three types of polymers, it being understood that all the tetrafluoroethylene polymers of this invention possess a high degree of polymerization and a sintering temperature of at least 300° C. Above the sintering temperature such polymers form a gel but they do not actually melt to a liquid. This is in contrast to the known relatively low molecular weight polymers derived from tetrafluoroethylene and certain tetrafluoroethylene polymer waxes, both of which have sharp melting points.

The thoroughly dry non-aqueous lubricated polymer compositions, which may be prepared by various methods described hereinafter, vary from putty-like masses to pulverulent solids, depending upon the amount and type of hydrocarbon employed. The compositions as prepared are suitable for directly extruding, calender-rolling, coating, molding, or otherwise fabricating into finished articles without further special treatment.

The following examples illustrate specific embodiments of this invention, and all parts are by weight unless otherwise specified. The aqueous colloidal polymer suspensions in Examples I and II were prepared by the method described in U. S. Serial No. 713,385, filed November 30, 1946, by M. M. Renfrew, and were concentrated by the method described in U. S. Patent 2,478,229. The aqueous colloidal polymer suspension in Example III was prepared as described in U. S. Serial No. 107,137, filed July 27, 1949 by K. L. Berry.

*Example I.*—An aqueous colloidal suspension of polytetrafluoroethylene was coagulated by rapid stirring and the major portion of water was removed. 90.8 parts of the resulting coagulum was stirred with 9.2 parts of petrolatum (Vaseline of m. p. 45°–48° C.) dissolved in benzene. The mixture was evaporated to dryness over-night in a steam oven to volatilize the benzene and the remaining traces of water. The dried composition was placed between two steel milling rolls and sheeted out at room temperature to a continuous sheet having a thickness of about 0.008 inch. The rolled sheet was then placed in an oven at 205° C. in order to volatilize the major portion of the petrolatum, and thereafter the sheet was heated at 332° C. to yield a very tough sintered sheet. Alternatively, when another sample of the unsintered sheet was heated directly to 332° C. without pre-volatilization, the sintered sheet appeared to be equivalent to the one just described. The sintered sheet is useful as an electrical tape for wrapping wire conductors.

*Example II.*—A sample of the dried lubricated polymer composition of Example I was compression molded at room temperature under 3,000 lbs./sq. in. into a ring ⅛ inch thick. The ring was digested over-night in hexane at 90° C. in order to extract the petrolatum. The polytetrafluoroethylene ring was then baked for one hour at 332° C. to form a tough sintered ring, which was useful as a gasket.

*Example III.*—An aqueous colloidal suspension of polytetrafluoroethylene was coagulated by vigorous stirring, the water was removed, and the coagulated polymer was dried at 110° C. Several lubricated polymer compositions were prepared using the dried coagulated polymer by dissolving the indicated amounts of each hydrocarbon lubricant in 400 parts of acetone and then adding the dried coagulated polytetrafluoroethylene. The resulting slurry was stirred vigorously for three minutes in a Waring Blendor, and then the acetone was removed by evaporation on a steam bath, giving a dry homogeneous molding powder.

Each of the prepared dried lubricated polymer compositions was placed in an extrusion chamber fitted with an hydraulically operated 1.25 inch diamter piston to force the lubricated polymer through a flat sheeting die with a 0.010 inch opening to yield a continuous length of a flat ribbon or tape.

The results of extruding the various compositions is indicated in the following table:

| Lubricant | Polymer | Pressure Developed, p. s. i. | Results |
|---|---|---|---|
| | Parts | | |
| 19 parts xylene. | 81 | 5,000- 9,000 | Good extrusion to give a smooth flexible tape. |
| 25 parts benzene. | 75 | 2,000- 4,000 | Extruded readily into a continuous tape with only a few slight cracks. |
| 19 parts n-decane. | 81 | 6,000-10,000 | Good extrusion into a smooth continuous tape which in a few minutes lost some of the lubricant and turned to a white opaque sheet. |
| 19 parts n-hexane. | 81 | 18,000 | Composition could not be extruded at all—when the die was opened, a molded brittle slug of the composition was removed and it broke apart into small particles upon slight compression. |

Each of the first three unsintered tapes produced above were placed in an oven and sintered at 380° C. for 20 minutes. In each case the sintered tape was a tough, continuous, transparent to translucent tape, except in the case of the benzene lubricated tape which after sintering had a few minor cracks, which indicated that the viscosity of the benzene lubricant was approaching the critical minimum viscosity which can be used for extrusion under these conditions with this quantity of lubricant.

The tetrafluoroethylene polymer for use in this invention may be obtained by coagulating an aqueous colloidal suspension of the polymer. It has been found that other finely divided forms of polytetrafluoroethylene, such as the granular form obtained by direct polymerization in accordance with U. S. Patents 2,230,654, 2,393,967, and 2,394,243, the micro-pulverized form, or any other form which has been mechanically subdivided from the massive polymer cannot readily be extruded or molded under pressure to yield satisfactory articles. For example, when the granular form of polytetrafluoroethylene, prepared according to the above patents and then disintegrated to small particles, is mixed with decane (75% polymer, 25% decane) and extruded into tape through a 0.010 inch slit die at approximately 26° C., the mixture of polymer and decane extrudes as a non-cohesive powder. The decane actually exudes from the mixture upon application of slight pressure, resulting in a discontinuous tape of non-uniform caliper. The granular polymer/decane mixture is quite different from the corresponding coagulated polymer/decane mixture in that the former shows no pressure-coalescing property when pressed on a flat surface, whereas the pressure-coalescing property is characteristic of the latter compositions.

The process of preparing the aqueous suspension of tetrafluoroethylene polymer is not the subject of this invention. However, suitable aqueous suspensions of polytetrafluoroethylene may be obtained by the methods described in U. S. Serial No. 713,385, filed November 30, 1946, by M. M. Renfrew, now Patent Number 2,534,058, U. S. Serial No. 107,137, filed July 27, 1949, by K. L. Berry, and U. S. Patent 2,478,229. Aqueous suspensions of tetrafluoroethylene copolymers may be obtained by the methods described in U. S. Serial No. 107,137, filed July 27, 1949, by K. L. Berry. Aqueous suspensions of tetrafluoroethylene polymers in which the end groups of the polymer chain are supplied by non-polymerizable compounds may be obtained by the same method as that described for the preparation of the polytetrafluoroethylene suspension as typified by Batch D of Example X in U. S. Serial No. 107,137, filed July 27, 1949, by K. L. Berry, except that, for example, 0.075 part of methanol as the non-polymerizable compound is added with the other reactants to the pressure vessel prior to polymerization. The particle size of the polymer evidently is rather highly critical, i. e., it should be colloidal before coagulation, and the smaller the particles the more easily the lubricated composition may be fabricated into articles. The particle size of the polymer in the suspensions described in the above-mentioned applications and patent in general ranges from 0.05 to 5 microns, which is the diameter of the average particle determined by an electron microscope measurement on a dried film obtained by depositing a highly diluted aqueous suspension of the polymer on a surface. These colloidal suspensions have been found quite suitable for coagulation in preparing the compositions of this invention. The colloidal particles of polytetrafluoroethylene retain their particulate form during coagulation although agglomeration may occur to some extent, whereby individual particles attach themselves to other particles without necessarily losing their identity, but this does not affect their ability to be fabricated when combined with the hydrocarbons of this invention. The coagulated mass is thus a characteristic physical form of the polytetrafluoroethylene. Moreover, polytetrafluoroethylene is virtually insoluble in practically all known solvents, and therefore the particles do not coalesce when merely suspended in organic media. To coalesce the particles in the composition of this invention, it is necessary to subject them to the action of heat and/or pressure. The colloidal particles possess marked adsorptive properties, and can be employed, for example, as adsorbents for hydrocarbons in much the same manner as charcoal or other highly adsorbptive solid materials. In this respect the colloidal form of polytetrafluoroethylene differs from other finely divided forms of the polymer.

The nature of the hydrocarbon for use in this invention is rather critical and it should have a viscosity of at least 0.45 centipoise at 25° C. and a melting point of less than 100° C. Mixtures of two or more hydrocarbons are also suitable provided they possess the above limitations. Examples of suitable hydrocarbons include essentially saturated aliphatic hydrocarbons, such as n-octane, n-nonane, n-decane, 2-methyldecane, n-eicosane, paraffin oils, mineral oils (e. g., "Primol"), petrolatum, and paraffin waxes; cycloaliphatic hydrocarbons, such as cyclohexane and methylcyclohexane; aromatic hydrocarbons, such as benzene, toluene, isomeric xylenes, tetrahydronaphthalene, decahydronaphthalene; and commercially available mixtures of two or more hydrocarbons. Minor amounts of unsaturated aliphatic hydrocarbons are usually present in commercial grades of the paraffin hydrocarbons, but these do not interfere with the practice of this invention, and for this reason the aliphatic hydrocarbons are termed "essentially saturated."

Certain physical properties of the hydrocarbon are critical. It has been found that the viscosity of the hydrocarbon and to some extent the lubricity influence the fabrication of the colloidal polytetrafluoroethylene, especially when subjected to pressure such as in extrusion and molding operations. The lubricity of the hydrocarbon is related to the length of the carbon chain, which in turn is related to the boiling point. For example, a hydrocarbon such as n-hexane, which has a viscosity at 25° C. of about 0.3 centipoise, will not produce uniform extruded articles at satisfactory rates. In fact, when pressure is applied to the mixture of colloidal polytetrafluoroethylene and hexane in the proportion of 75 parts of polymer to 25 parts of hexane, the hexane is not retained by the polymer; hence, there is no continuity of extrusion, resulting in non-uniform articles containing irregular shapes, fissures, and the like. Likewise, the polymer and hexane separate when subjected to either pressure or elevated temperatures in molding and coating operations. Therefore, the hydrocarbon should have a viscosity of at least 0.45 centipoise at 25° C., the upper limit being set by the melting point limitation of less than 100° C.

The proportion of hydrocarbon in the compositions is as critically important as the properties of the hydrocarbon. Compositions containing more than 50% hydrocarbon are too fluid for such forming operations as extrusion, calendering, and molding, in that they do not retain their form under pressure. This means the flow of the composition cannot be controlled under pressure to give accurate tolerances in the fabricated articles. Furthermore, more than 50% hydrocarbon presents uneconomic disadvantages in the removal of the hydrocarbon lubricant. Less than 5% hydrocarbon is ineffective in producing sufficient lubrication of the polymer for extruding or otherwise fabricating articles at commercially satisfactory rates. It is preferred to use from 15% to 30% of the hydrocarbon or mixture of hydrocarbons, since these proportions yield compositions which possess optimum properties for processing into various articles by extruding, molding, calendering, coating, and the like. All percentages of hydrocarbon throughout the specification are based on the combined weight of dry tetrafluoroethylene polymer and hydrocarbon in the composition.

The compositions of this invention may be prepared by a variety of methods. One such method comprises intimately mixing the hydrocarbon with an aqueous suspension of colloidal polytetrafluoroethylene under high speeds of agitation with or without a dispersing agent, followed by coagulation accomplished by the addition of either an electrolyte or a water miscible organic liquid such as acetone or alcohol. In this method it is preferred to use one of the many suitable dispersing agents disclosed in U. S. Patent 2,478,229. An equally satisfactory method for obtaining the compositions involves coagulating an aqueous suspension of colloidal polytetrafluoroethylene, drying the coagulated polymer, suspending the coagulated polymer in an organic liquid vehicle which may be soluble in the hydrocarbon (e. g., methanol or tertiary butanol), and then adding the hydrocarbon with continuous stirring, followed by filtering or evaporation of the suspending vehicle. A third method comprises spraying a mist of the hydrocarbon or a solution thereof onto the dry coagulated polymer particles while the particles are being tumbled in a rotating blender. A fourth method employs high speed agitation of the dried coagulated polymer in the presence of the hydrocarbon. The only requirement for preparing satisfactory compositions is to thoroughly and intimately disperse the hydrocarbon throughout the particles of the coagulated polymer.

Other materials may be incorporated in the compositions of this invention depending upon the properties desired in the finished articles fabricated from the compositions. Thus, it has been found that finely divided solid fillers, pigments, dyes, other lubricants (e. g., silicone oils (polyorganosiloxanes), high-boiling esters such as dibutyl phthalate and tricresyl phosphate, naturally occurring low-melting waxes, and fluorinated hydrocarbon oils, all of which should have a viscosity of 0.45 to 1000 centipoises at 25° C.), plasticizers, and the like may be added to the compositions in varying amounts. Examples of suitable fillers and pigments which may thus be employed include carbon black, graphite, mica, talc, silica, asbestos, and titanium dioxide. All of these fillers and pigments should be in finely divided form and preferably should be of the approximate particle size of the polymer used in the mixture. The fillers and pigments may be employed in amounts varying from relatively small amounts up to as much as 400%, based on the dry weight of the tetrafluoroethylene polymer in the composition. All of these additional modifiers may be incorporated into the composition at any time prior to fabrication into the finished article. The fillers and pigments serve either to color the polymer or to extend and reinforce the polymer, resulting in mixtures having increased elongation in some cases and in mixtures having a lower cost where a cheap filler is selected. However, if the best electrical properties inherent in the polytetrafluoroethylene are desired, it will generally not be practical to employ large amounts of these other additives The chief advantage of this invention is that the polytetrafluoroethylene compositions may readily be extruded at relatively low temperatures (i. e., at 15° C. to 150° C.) under compacting pressure into various shapes at rates up to and sometimes over 50 feet per minute, whereas prior to this invention melt extrusion rates were limited to approximately 50 feet per hour at much higher temperatures. These extruded shapes may readily be freed from all hydrocarbons by either volatilizing the hydrocarbon or extracting the hydrocarbons with a solvent. Following removal of the hydrocarbon the shaped article is baked at a temperature above 327° C. until sintered, and thereafter either annealed or quenched. The process of preparing extruded articles from lubricated polytetrafluoroethylene is more fully described and claimed in U. S. Serial No. 171,534 of Llewellyn and Lontz, filed June 30, 1950.

Another advantage of this invention is that the compositions provide a means for molding polytetrafluoroethylene at temperatures as low as room temperature and above into useful articles, following which the hydrocarbon may be removed as above and the article finally sintered at a temperature above 327° C. Still, another advantage of the compositions of this invention lies in the fact that they may be calendered over asbestos, paper, cloth, foil and the like, following which the hydrocarbon may be removed as above and the extruded article sintered at a temperature above 327° C. if desired. For example, the composition may be coated by spreading, by using a doctor knife, or by rolling the composition onto supporting structures such as asbestos cloth, webbing, boards, porous ceramic surfaces, glass cloth, metal screens, and the like.

The compositions of this invention are useful for extrusion into various forms such as filaments, beading, films, sheets, tubes, rods, tapes; extrusion coatings on wires, calender rolling into sheets; coating and calendering over paper, cloth, foil, and the like; and for molding into various articles. Another particularly suitable application involves use of the compositions for bonding or repairing sections of polytetrafluoroethylene film or sheeting. For example, several sections of an unbaked, unsintered sheet extruded from one of the lubricated polymer compositions of this invention have been lapped and securely bonded to give satisfactory bonds.

Another application for the compositions of this invention involves a simplified method for joining spliced sections of polytetrafluoroethylene coated wire conductors. This method involves the steps of wrapping the spot to be spliced with one or more layers of unsintered lubricated polytetrafluoroethylene tape extruded from one of the lubricated compositions of this invention, and thereafter heating the resulting assembly above 327° C. to sinter the whole and effect bonding to the conductor and its coating. The same wrapping technique may be applied to the covering of other metal articles such as iron magnets, coils, and the like, where it is desired to cover the article with a chemically-inert, corrosion-resistant, electrical insulating covering.

This application is a continuation-in-part of my co-pending application, Serial No. 735,535, filed March 18, 1947, now abandoned.

I claim:

1. A non-aqueous pressure-coalescing composition which comprises tetrafluoroethylene polymer particles of colloidal size intimately admixed with a hydrocarbon having a viscosity of at least 0.45 centipoise at 25° C. and having a melting point of less than 100° C., said tetrafluoroethylene polymer having a polymerized tetrafluoroethylene content in excess of 85% by weight and having a sintering temperature in excess of 300° C., said hydrocarbon being present in an amount of 5% to 50% based on the combined weight of tetrafluoroethylene polymer and hydrocarbon.

2. The composition of claim 1 in which the said hydrocarbon is an unctuous petroleum lubricant.

3. The composition of claim 1 in which the said hydrocarbon is petrolatum.

4. The composition of claim 1 in which 15% to 30% hydrocarbon is present.

5. The composition of claim 1 in which the said polymer is polytetrafluoroethylene.

WALTER E. LLEWELLYN.

REFERENCES CITED

The following references are of record in the file of this patent:

UNITED STATES PATENTS

| Number | Name | Date |
|---|---|---|
| 2,411,159 | Hanford | Nov. 19, 1946 |